US 6,663,936 B2

(12) United States Patent
Brazier

(10) Patent No.: US 6,663,936 B2
(45) Date of Patent: Dec. 16, 2003

(54) CONTINUOUS ROLL MATTING WITH POST APPLIED EDGES

(75) Inventor: Peter C. Brazier, Leighton Buzzard (GB)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/220,758

(22) PCT Filed: Mar. 1, 2001

(86) PCT No.: PCT/GB01/00872
§ 371 (c)(1),
(2), (4) Date: Dec. 11, 2002

(87) PCT Pub. No.: WO01/65993
PCT Pub. Date: Sep. 13, 2001

(65) Prior Publication Data
US 2003/0148058 A1 Aug. 7, 2003

(30) Foreign Application Priority Data
Mar. 4, 2000 (GB) .............................................. 0005176

(51) Int. Cl.⁷ ............................. B32B 3/02; B27N 3/10; A47G 9/06; A47K 7/02
(52) U.S. Cl. ........................ 428/88; 428/156; 428/192; 264/252; 264/257; 15/215; 5/417
(58) Field of Search .............................. 428/81, 85, 88, 428/95, 156, 192, 906; 5/417; 15/215; 264/167, 239, 252, 257

(56) References Cited

U.S. PATENT DOCUMENTS

| 4,399,176 A | * | 8/1983 | Bell et al. ...................... 428/85 |
| 4,618,466 A | | 10/1986 | McGlashen et al. ........ 264/40.6 |
| 4,654,245 A | * | 3/1987 | Balzer et al. .................. 428/52 |

FOREIGN PATENT DOCUMENTS

| GB | 1173138 | 6/1966 | .......... A47G/27/02 |
| WO | WO 92/02163 | 7/1990 | .......... A47G/27/02 |

* cited by examiner

Primary Examiner—Donald J. Loney
(74) Attorney, Agent, or Firm—Terry T. Moyer; Charlotte C. Wilson

(57) ABSTRACT

A substantially rectangular mat comprises an upper layer of fabric (31) bonded to a lower backing layer of natural or synthetic rubber (32). The lower backing layer (32) extends beyond the upper fabric layer to form a border strip (33) at first and second opposite edges (43,44) of the mat. The lower backing layer (32) ends flush with the upper fabric layer at third and fourth opposite edges (41,42) of the mat. Each of the third and fourth edges is provided with a moulded strip (15) of synthetic or natural rubber attached to the lower backing layer (32) to form a border strip.

15 Claims, 5 Drawing Sheets

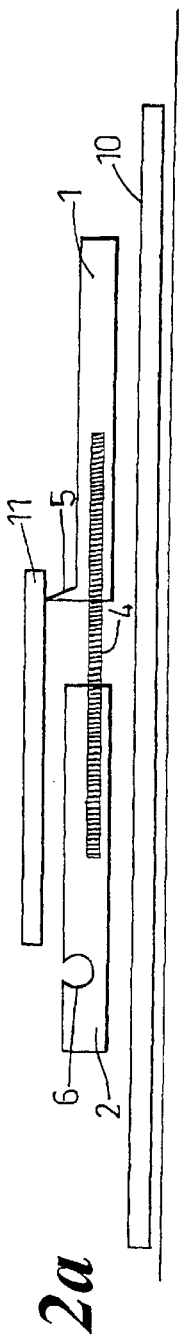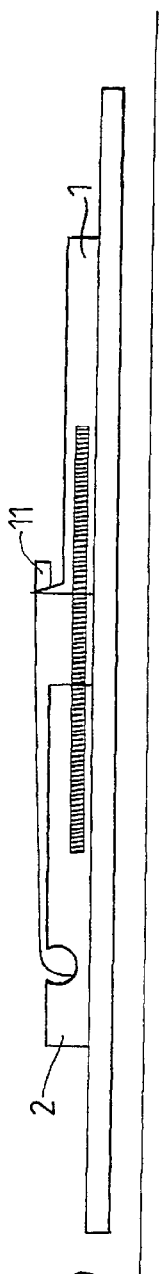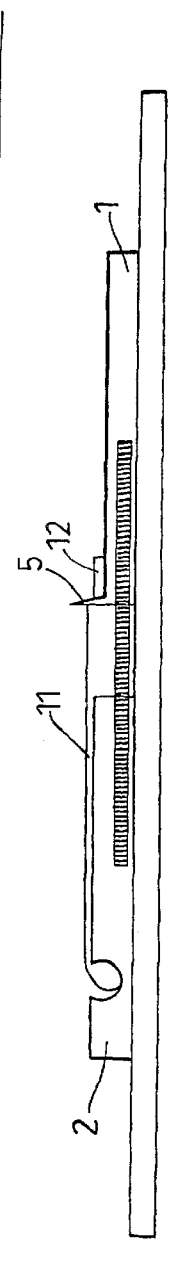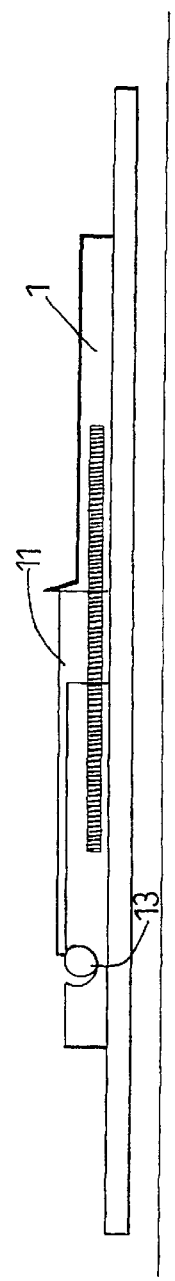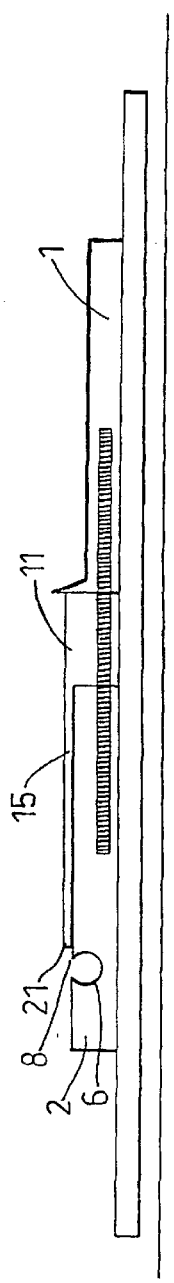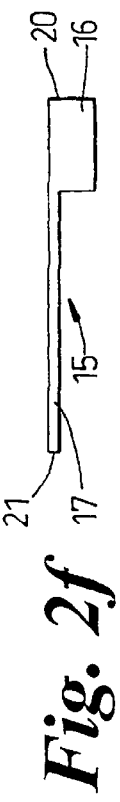

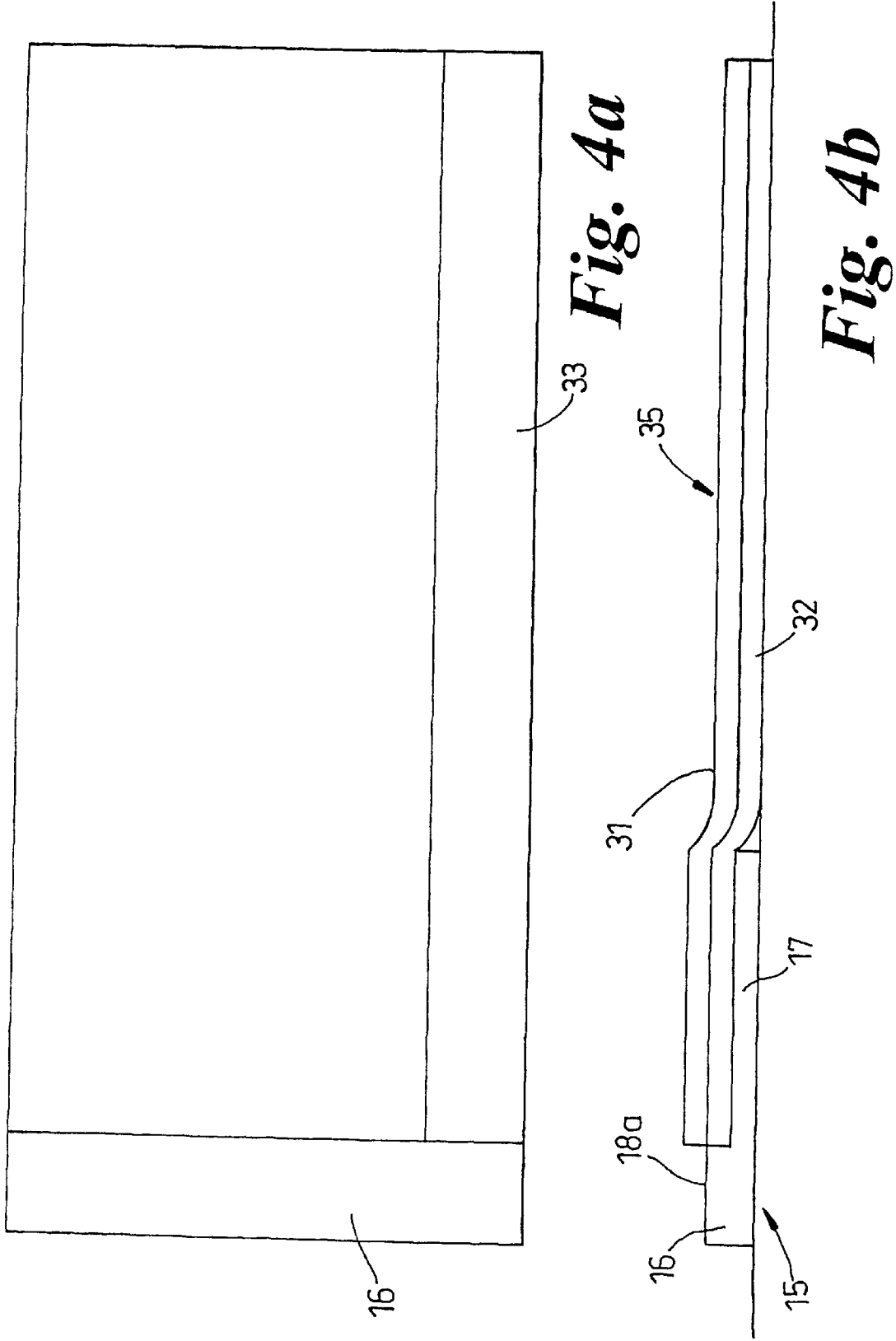

CONTINUOUS ROLL MATTING WITH POST APPLIED EDGES

TECHNICAL FIELD

This invention relates to a mat of the type where a natural or synthetic rubber backing sheet is secured to the back of a fabric layer leaving a rubber border extending beyond the fabric layer, and to a method of manufacturing such a mat.

BACKGROUND

It is well known to lay floor mats at the entrance of buildings such as dwellings and offices, for scraping and wiping the undersides of the footwear of persons entering the buildings. Scraper mats may also be employed for reducing levels of mud carried on footwear in locations such as building sites and farms. Such mats have a natural or synthetic rubber backing sheet to prevent the passage of dirt through the mat. The backing sheet extends beyond the fabric to form a border, which defines the edge of the mat.

It is known to provide such mats in the form of a continuous roll of matting, which may be cut to the required length to form a mat. The continuous roll of matting is provided with rubber borders at each longitudinal edge, formed by the backing sheet, which is wider than the mat fabric. When the mat is cut to length, the lateral edges have rubber borders, since they correspond to the longitudinal edges of the continuous roll. However the top and bottom cut edges do not have rubber borders, resulting in a mat which is not aesthetically pleasing. It is known to use extruded plastic edging strips at the top and bottom of the cut mat, but such edging strips do not match exactly the rubber borders at the lateral edges, and are not compatible with the mat, causing distortion and rippling. Furthermore, the mats are not launderable, because the plastic strips cannot withstand the heat of the laundering process.

SUMMARY

It is an object of the present invention to provide a mat which may be cut to length from a roll, but which is launderable and as aesthetically pleasing as a made-to-measure mat.

According to a first aspect of the present invention there is provided a substantially rectangular mat comprising an upper layer of fabric bonded to a lower backing layer of natural or synthetic rubber, whereby the lower backing layer extends beyond the upper fabric layer to form a border strip at first and second opposite edges of the mat, and whereby the lower backing layer ends flush with the upper fabric layer at third and fourth opposite edges of the mat, each of the third and fourth edges being provided with a moulded strip of synthetic or natural rubber attached to the lower backing layer to form a border strip.

Preferably, the moulded strip is attached to the lower backing layer by adhesive.

Preferably the moulded strip is formed such that the border strips at the third and fourth edges are of substantially the same appearance as the border strips at the first and second edges.

Preferably, the moulded strip includes a thin web portion that is secured beneath the backing layer and a thick web portion that abuts an edge of the backing layer.

According to a second aspect of the present invention, there is provided a method of making a mat comprising the steps of:

providing an elongate roll of mat material comprising an upper layer of fabric bonded to a lower backing layer of natural or synthetic rubber, whereby the lower backing layer extends beyond the upper fabric layer to form a border strip at the longitudinal edges of the elongate roll;

cutting transversely the elongate roll to form a portion of the elongate roll in which the lower backing layer extends beyond the upper fabric layer to form a border strip at first and second opposite edges of the mat, and in which the lower backing layer ends flush with the upper fabric layer at third and fourth opposite edges of the mat;

attaching a moulded strip of synthetic or natural rubber to the lower backing layer to form a border strip at the third and fourth opposite edges of the mat.

Preferably, the moulded strip is attached to the lower backing layer by adhesive.

Preferably, the moulded strip is formed such that the border strips at the third and fourth edges are of substantially the same appearance as the border strips at the first and second edges.

According to a third aspect of the present invention, there is provided a border strip for use in the method according to the second aspect of the invention, the border strip comprising an elongate member of natural or synthetic rubber of uniform cross-section, having a thick web portion and a thin web portion arranged adjacent to the thick web portion to form a generally L-shaped cross-section, the thin web portion being adapted to be secured beneath the backing layer of a mat in use, the thick web portion being adapted to abut the edge of a mat in use.

According to a fourth aspect of the present invention, there is provided a method of manufacturing a border strip according to the third aspect of the invention, the method comprising the steps of:

arranging first and second elongate mould plates in spaced apart relationship with a gap there between, said first mould plate having a cutting edge arranged adjacent to the gap, and said second mould plate being provided with a longitudinal channel in its upper surface extending parallel to and distal from the gap;

introducing fluid rubber into the mould such that the gap is filled with rubber and the rubber extends over the upper surface of the second mould plate and flows into the channel;

allowing the fluid rubber to cure to form a thick web in the gap, a thin web on the upper surface of the second mould plate, and a bead in the channel; and removing the thick web and thin web from the mould and thereby separating the thin web from the bead in the channel.

Preferably, fluid rubber is introduced into the mould by placing a sheet of uncured rubber on top of the mould and heating the rubber in situ so that it flows into the mould.

Preferably, the rubber is heated in a heated press.

Preferably, the fluid rubber extends over the cutting edge of the first mould plate. Preferably, the excess rubber is removed from the surface of the first mould plate after curing by a cutting action of the cutting edge.

Preferably, the longitudinal channel has a narrow neck. Preferably, the separation of the thin web from the rubber bead is accomplished by the cutting action of a cutting edge provided at the neck of the channel. The thick web and thin web may be lifted from the mould and the separation accomplished by a tearing action.

BRIEF DESCRIPTION OF THE DRAWINGS

Various embodiments of the invention will now be described, by way of example only, with reference to the accompanying drawings, in which:

FIG. 1b is a plan view on the mould of FIG. 1a;

FIGS. 2a to 2f are side elevations on the mould of FIG. 1a during successive steps of the method of manufacture of a moulded strip for use in a mat in accordance with the invention;

FIG. 4a is a plan view on a mat in accordance with the invention after attachment of the moulded strip;

FIG. 4b is a side elevation on the mat of FIG. 4a; and

DETAILED DESCRIPTION

Figure 1A:
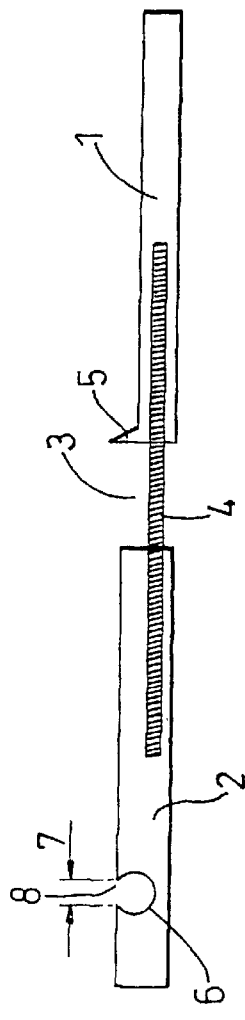
FIG. 1a is a side elevation on a mould used to produce a moulded strip for use in a first embodiment of a mat in accordance with the invention.
Figure 1B:
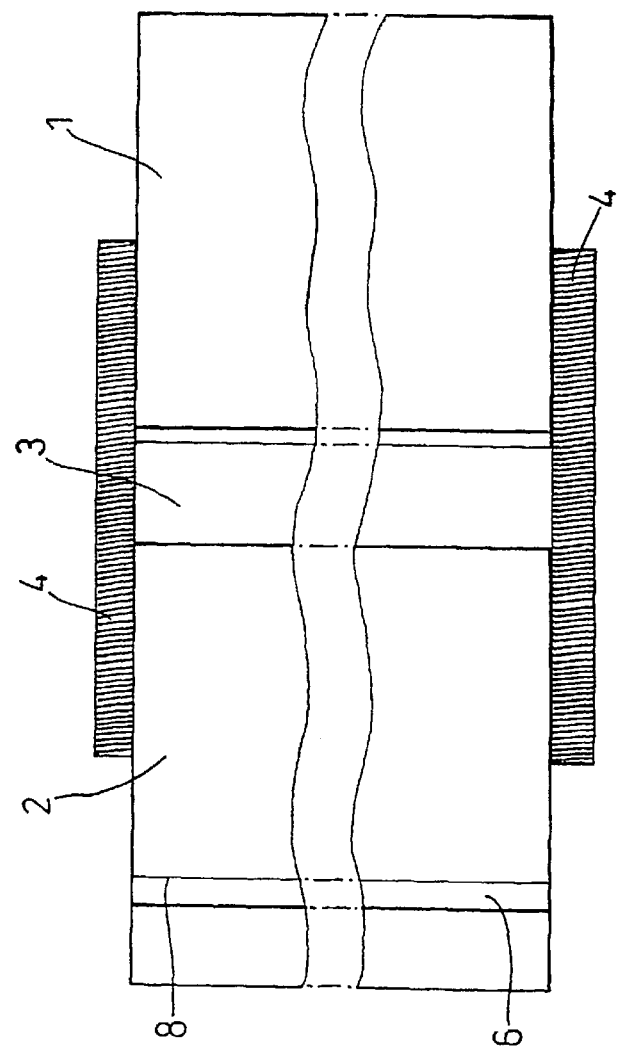

With reference to FIGS. 1a and 1b there is shown a mould for forming a border strip for use in making the mat of the present invention. The dimensions described as examples are not to be understood to be limiting to the invention. The mould comprises two elongate extruded metal plates 1,2 held together at a predetermined spacing (typically 20 mm) to form a gap 3 by joint pieces 4 which may be secured by any suitable means to the sides of the plates 1,2. The metal plates 1,2 are sufficiently long to be able to form in one piece a moulded border strip long enough to extend across the entire width of a roll of mat. The first plate 1 is typically 40 mm wide and is provided with a cutting edge 5 adjacent to the gap 3. The height of the cutting edge 5 from the underside of the first plate 1 is equal to the required thickness of the moulded border strip. The second plate 2 is provided with a longitudinal channel 6 typically at a distance of 40 mm from the gap 3. The channel 6 has a narrow neck portion 7, which has a cutting edge 8 at the side nearest the gap 3. The height of the second plate 2 is less than the height of the cutting edge 6 of the first plate 1, the difference in height being the thickness of the thin portion of the moulded border strip adapted to fit under the mat to which the strip is to be attached. Typically, this thickness is less than 1 mm, usually between 0.5 mm and 1 mm.

The method of forming a border strip is described with reference to FIGS. 2a to 2f. The two plates 1,2 making up the mould are placed on a conveyor belt 10, while a rubber piece 11 is introduced over the mould (see FIG. 2a). The conveyor belt conveys the mould and rubber along a press line, and the rubber 1 is pressed into the mould 1,2 while fluid, under the action of heating (see FIG. 2b). As the rubber 11 cures by the process of vulcanisation, the cutting edge 5 cuts and separates the rubber 11, forming a straight edge 20 and allowing the surplus rubber 12 to be removed (see FIGS. 2c and 2f). This makes a separate trimming operation or further processing of the edge unnecessary. It is to be understood that although curing and/or vulcanisation has been described as the preferred process by which the rubber hardens or solidifies, other processes which cause the rubber to harden or solidify may be used.

The rubber is pressed into the channel 6 to form a bead 13, which anchors any rubber 14 that flows beyond the channel 6 to the second plate 2. When the rubber 11 forming the thick web and thin web has cured, it can be pulled away from the mould 1,2, leaving the rubber bead 13 in the channel 6. The cutting edge 8 ensures that the rubber in and beyond the channel 6 is readily separated from the rubber of the thin web, leaving a neat cut edge 21 (see FIGS. 2d and 2e). A separate trimming operation or further processing of the cut edge 21 is unnecessary.

The finished moulded border strip 15 is shown in FIG. 2f after removal from the mould. The border strip 15 is supplied in lengths equal to the overall width of the roll of mat with which the border strip is to be used. The border strip has a thick web 16, which in use forms the visible border of the cut mat, and a thin web 17, which in use is positioned beneath the rubber backing layer of the cut mat. The thick web typically has a thickness of between 1 mm and 3 mm, while the thin web typically has a thickness of between 0.5 mm and 1 mm. Of course variations in these dimensions are envisaged and fall within the scope of the invention.

Figure 5:
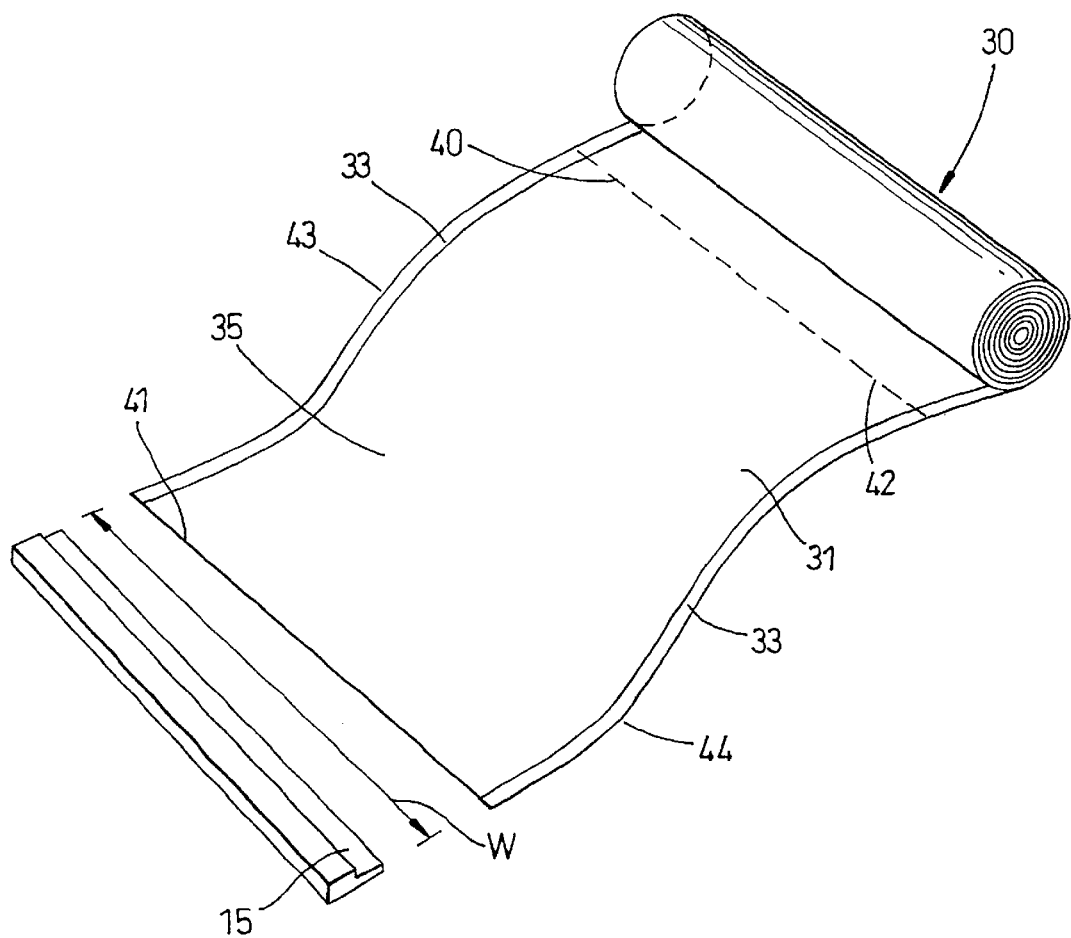
FIG. 5 shows a roll of mat and a moulded strip used to make a mat according to the invention.

FIG. 5 shows a border strip 15 and a roll of mat 30. The mat 30 comprises a fabric layer 31 on a backing layer 32 of natural or synthetic rubber. The backing layer 32 is of overall width W and extends beyond the fabric upper layer 31 at both longitudinal edges of the mat 30 to form rubber borders 33.

In use, the roll of mat is unrolled to the required length and cut transversely along cut line 40, to form a mat 35 of the required size. After cutting, the cut edges 41,42 may be further trimmed if necessary to ensure that the edges are perfectly straight and square to the uncut edges 43,44.

Figure 3A:
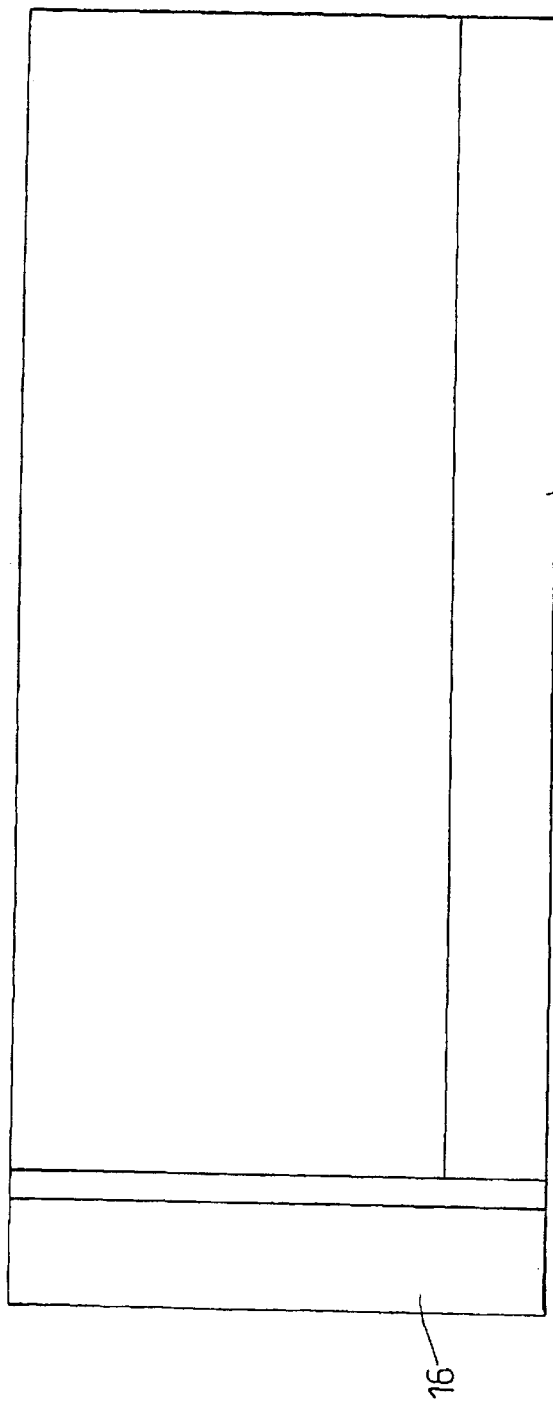
FIG. 3a is a plan view on a mat in accordance with the invention before attachment of the moulded strip.
Figure 3B:
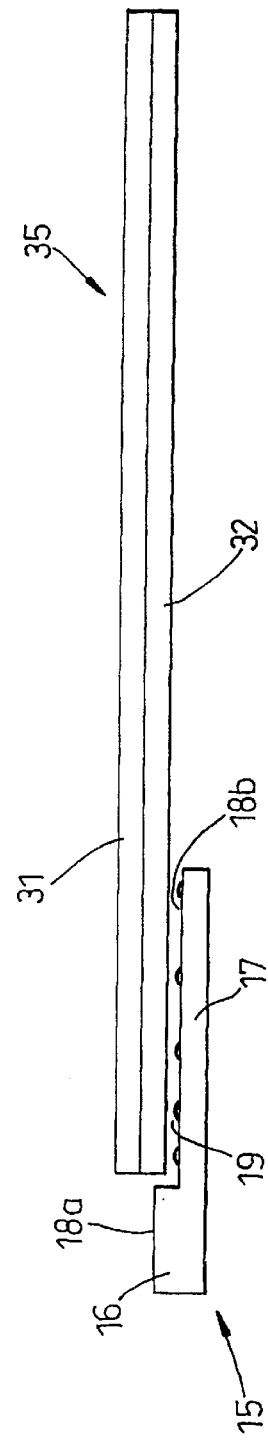
FIG. 3b is a side elevation on the mat of FIG. 3.

A moulded border strip 15 of length W is placed adjacent to the cut edge 41, so that the backing layer 32 overlaps the thin web 17, as shown in FIGS. 3a and 3b. Adhesive 19 is applied to the top surface 18b of the thin web 17, starting at one end of the border strip 15, and the mat 35 is pressed onto the border strip to secure the border strip 15 to the mat 35. If necessary the ends of the border strip may be trimmed to ensure a flush finish at the uncut edges 43,44. The finished edge is shown in FIGS. 4a and 4b.

If moulded nitrile rubber is used for the border strip and the backing layer, then a suitable adhesive is Loctite 4062J. This adhesive bonds rapidly and should be applied using dispensing needles in an AS@ pattern along the length of the thin web 17. However, it is to be understood that other forms of adhesive may be used, such as glues or double sided tape.

A second moulded border strip 15 is attached to the other cut edge 42, in the same manner, to complete the mat 35.

The mat so formed has the appearance of a conventional, custom-made mat. If desired, the upper face 18a of the thick web 16 of the border strip 15 may be formed with a moulded pattern to match any pattern on the borders 33 of the rolled mat 30. The resulting borders at the cut edge 41,42 are identical to the borders 33 at the side edges 43,44 formed during the manufacture of the rolled mat. This results in an aesthetically pleasing mat, which has the advantage of being launderable, if an adhesive is used which is resistant to high temperature laundering, such as Loctite 4062J.

The use of a rubber material for the border strips means that the material is compatible with the base layer material and borders of the rolled mat.

The method of the invention can be used to provide mats of the required length from a standard roll of matting. The method of the invention can also be used to repair a mat by cutting off a damaged edge and bonding a replacement moulded border strip to the cut edge of the mat.

The invention is not limited to the embodiments herein described but may vary in construction and detail.

What is claimed is:

1. A substantially rectangular mat including an upper layer of fabric bonded to a lower backing layer of natural or synthetic rubber, whereby the lower backing layer extends beyond the upper fabric layer to form a border strip at first and second opposite edges of the mat, and whereby the lower backing layer ends flush with the upper fabric layer at third and fourth opposite edges of the mat, each of the third and fourth edges being provided with a moulded strip of synthetic or natural rubber attached to the lower backing layer to form a border strip.

2. A mat according to claim 1, in which the moulded strip is attached to the lower backing layer by adhesive.

3. A mat according to claim 1, in which the moulded strip is formed such that the border strips at the third and fourth edges are of substantially the same appearance as the border strips at the first and second edges.

4. A mat according to claim 1, in which the moulded strip includes a thin web portion that is secured beneath the backing layer and a thick web portion that abuts an edges of the backing layer.

5. A method of making a mat, the method including the steps of:

providing an elongate roll of mat material including an upper layer of fabric bonded to a lower backing layer of natural or synthetic rubber, whereby the lower backing layer extends beyond the upper fabric layer to form a border strip at the longitudinal edges of the elongate roll;

cutting transversely the elongate roll to form a portion of the elongate roll in which the lower backing layer extends beyond the upper fabric layer to form a border strip at first and second opposite edges of the mat, and in which the lower backing layer ends flush with the upper fabric layer at third and fourth opposite edges of the mat; and attaching a moulded strip of synthetic or natural rubber to the lower backing layer to form a border strip at the third and fourth opposite edges of the mat.

6. A method according to claim 5, in which the moulded strip is attached to the lower backing layer by adhesive.

7. A method according to claim 5, in which the moulded strip is formed such that the border strips at the third and fourth edges are of substantially the same appearance as the border strips at the first and second edges.

8. A border strip for use in a method according to claim 5, the border strip including an elongated member of natural or synthetic rubber of uniform cross-section, having a thick web portion and a thin web portion arranged adjacent to the thick web portion to form a generally L-shaped cross-section, the thin web portion being adapted to be secured beneath the backing layer of a mat in use, the thick web portion being adapted to abut the edge of a mat in use.

9. A method of manufacturing a border strip, the method comprising the steps of:

arranging first and second elongate mould plates in spaced apart relationship with a gap there between, the first mould plate having a cutting edge arranged adjacent to the gap, and the second mould plate being provided with a longitudinal channel in its upper surface extending parallel to and distal from the gap;

introducing fluid rubber into the mould plates such that the gap is filled with rubber and the rubber extends over the upper surface of the second mould plate and flows into the channel;

allowing the fluid rubber to cure to form a thick web in the gap, a thin web on the upper surface of the second mould plate, and a bead in the channel; and removing the thick web and thin web from the mould plates and thereby separating the thin web from the bead in the channel.

10. A method according to claim 9, in which fluid rubber is introduced into the mould by placing a sheet of uncured rubber on top of the mould and heating the rubber in situ so that it flows into the mould.

11. A method according to claim 10, in which the rubber is heated in a heated press.

12. A method according to claim 9, in which the fluid rubber extends over the cutting edge of the first mould plate.

13. A method according to claim 9, in which excess rubber is removed from the surface of the first mould plate after curing by a cutting action of the cutting edge.

14. A method according to claim 9, in which the longitudinal channel has a narrow neck.

15. A method according to claim 9, in which the thin web is separated from the rubber bead by the culling action of a cutting edge provided at the neck of the channel.

* * * * *

UNITED STATES PATENT AND TRADEMARK OFFICE
CERTIFICATE OF CORRECTION

PATENT NO. : 6,663,936 B2
DATED : December 16, 2003
INVENTOR(S) : Peter C. Brazier It is certified that error appears in the above-identified patent and that said Letters Patent is hereby corrected as shown below:

<u>Column 6,</u>
Line 43, after the word "the", delete "culling" and insert -- cutting --.

Signed and Sealed this

Fourteenth Day of September, 2004

JON W. DUDAS
*Director of the United States Patent and Trademark Office*